United States Patent
Leppert

(10) Patent No.: US 8,350,224 B2
(45) Date of Patent: Jan. 8, 2013

(54) SCINTILLATOR ARRANGEMENT FOR DETECTING X-RAY RADIATION AND X-RAY DETECTOR WITH SUCH A SCINTILLATOR ARRANGEMENT

(75) Inventor: Jürgen Leppert, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 355 days.

(21) Appl. No.: 12/706,048

(22) Filed: Feb. 16, 2010

(65) Prior Publication Data

US 2010/0207031 A1    Aug. 19, 2010

(30) Foreign Application Priority Data

Feb. 17, 2009   (DE) .......................... 10 2009 009 051

(51) Int. Cl.
*G01T 1/20*     (2006.01)
(52) U.S. Cl. ....................................... 250/368
(58) Field of Classification Search .................. 250/368
See application file for complete search history.

(56) References Cited

U.S. PATENT DOCUMENTS

| | | | |
|---|---|---|---|
| 4,491,736 A | 1/1985 | Teraoka | |
| 5,518,658 A | 5/1996 | Rossner | |
| 5,518,659 A | 5/1996 | Rossner | |
| 5,640,016 A | 6/1997 | Matsuda | |
| 7,138,633 B1 * | 11/2006 | Rozsa et al. | 250/368 |
| 7,442,938 B2 * | 10/2008 | Jiang et al. | 250/368 |
| 7,728,302 B2 * | 6/2010 | Zeitler et al. | 250/370.11 |

FOREIGN PATENT DOCUMENTS

| | | |
|---|---|---|
| DE | 4402258 A1 | 7/1995 |
| DE | 19506368 A1 | 8/1995 |

* cited by examiner

*Primary Examiner* — Constantine Hannaher
(74) *Attorney, Agent, or Firm* — Harness, Dickey & Pierce, P.L.C.

(57) ABSTRACT

A scintillator arrangement for detecting X-ray radiation includes a plurality of pixels separated from one another by reflectors and made of a scintillator ceramic, doped in particular by cerium, for converting the X-ray radiation into visible light. In at least one embodiment, the reflectors are designed for absorbing light with a wavelength range which corresponds to a selected emission band of the scintillator ceramic. Thus, the concentration of cerium in the scintillator ceramic can be reduced and this leads to an increased light yield.

20 Claims, 2 Drawing Sheets

SCINTILLATOR ARRANGEMENT FOR DETECTING X-RAY RADIATION AND X-RAY DETECTOR WITH SUCH A SCINTILLATOR ARRANGEMENT

PRIORITY STATEMENT

The present application hereby claims priority under 35 U.S.C. §119 on German patent application number DE 10 2009 009 051.7 filed Feb. 17, 2009, the entire contents of which are hereby incorporated herein by reference.

FIELD

At least one embodiment of the invention generally relates to a scintillator arrangement for detecting X-ray radiation. At least one embodiment of the invention furthermore generally relates to an X-ray detector with such a scintillator arrangement.

BACKGROUND

In computed tomography, X-ray detectors are used for detecting medicinal X-ray radiation; these detectors have a two-dimensional scintillator arrangement or sensor array made of a scintillator material, also known as a fluorescent substance. The scintillator material usually converts the high-energy X-ray radiation into visible light. Suitable fluorescent substances include e.g. rare-earth oxysulfides, which form an oxysulfide ceramic. Moreover, praseodymium, with peaks at 511 nm, 630 nm and 670 nm, is often used for doping the fluorescent substance.

In order to attain a good resolution, the sensor array has a pixel-like structure with a plurality of pixels arranged, in particular, in two dimensions, wherein a pixel generally has a surface of approximately 1 mm×1 mm directed toward an X-ray source. The light produced in the scintillator material of the pixel is subsequently detected and measured by a photosensitive element such as a photodiode, a photomultiplier or a light-sensitive film. The photosensitive elements are likewise arranged in an array, e.g. a photodiode array, corresponding to the pixel-like structure of the sensor array.

Scintillator materials with extremely low afterglow are required for the X-ray detectors used in computed tomography in order to attain a sufficiently high read-out frequency. In order to reduce the so-called afterglow, additionally doping the oxysulfide ceramic with cerium (Ce) has, for example, been disclosed, wherein the Ce content usually lies between 3-50 ppm, preferably between 10-30 ppm. Herein, afterglow is understood to mean the effect that part of the incident X-ray radiation is not converted into light immediately, but with a time delay. As a result of the oxidation of $Ce^{3+}$ to $Ce^{4+}$, the ceramic is dyed yellow.

As a result of the yellow coloring of the oxysulfide ceramic, there is a reduction in the emission band at 511 nm, which is to a large extent responsible for an undesired signal drift when detecting the visible light. This signal drift occurs when there is relatively long irradiation and results in, for example, the formation of artifacts in the computed tomography examination recordings. The signal drift is generated by the formation of color centers, which change the absorption around 511 nm. Therefore, signal drift is understood to mean the change of the signal, particularly the reduction of the signal intensity in a certain wavelength range, as a result of an increase in the color centers and thus in the absorption during the course of irradiation. The mechanism of drift reduction by cerium consists of the emission bands at 511 nm being partly absorbed by the yellow coloring of the ceramic and thus the relative change is minimized.

Vacancies in the crystal, where anions are missing, are referred to as color centers. The charge of the missing anions is compensated for by one or more electrons occupying the vacancies. These electrons can absorb electromagnetic radiation in the visible light wavelength range and this is expressed by a discoloring of the crystal—in the case of the oxysulfide ceramic, the latter discolors to yellow. Therefore, a relatively high Ce concentration in the scintillator material both improves the afterglow and reduces the signal drift. However, a disadvantage in this process is that the light yield decreases with increasing Ce concentration.

In a scintillator arrangement of an X-ray detector, reflectors are arranged between the scintillator ceramics of the pixels and these surround the individual pixels on five sides and thus prevent a penetration of the light generated into an adjoining pixel or prevent the light escaping to the outside. The reflectors usually comprise titanium dioxide and epoxy resin as a binding material, wherein titanium dioxide has high reflectivity in the emission region of the scintillator ceramic between 450 nm and 800 nm and so the light quanta or photons generated in the scintillator ceramic are reflected by the reflector when they reach the boundary of the detector element.

As a result of the subdivision of the detector surface into individual pixels surrounded by a light-reflecting material, the path covered by the reflected photons before said photons reach the photosensitive element increases. Therefore, the signal drift in a so-called structured scintillator arrangement having pixels with a size of approximately 1 $mm^2$ increases by a factor of 1.5 to 2.5 compared to its unstructured disk made of a fluorescent material ceramic. This makes the design (sorting) of the X-ray detector relatively complicated because arrays with similar properties have to be grouped next to one another.

DE 44 02 258 A1 describes a fluorescent material, provided for use in computed tomography, based on a rare-earth oxysulfide. In order to reduce the afterglow, the fluorescent material ceramic comprises molybdenum doping with a proportion of approximately $10^{-1}$ to $10^{-6}$ mole percent in addition to the cerium.

SUMMARY

In at least one embodiment of the invention an improved light yield is permitted in a scintillator arrangement.

According to at least one embodiment of the invention, a scintillator arrangement for detecting X-ray radiation includes a plurality of pixels separated from one another by reflectors and made of a scintillator ceramic for converting the X-ray radiation into visible light, wherein the reflectors are designed for absorbing light with a predetermined wavelength range, which corresponds to a selected emission band of the scintillator ceramic.

At least one embodiment of the invention is based on the consideration that, as a result of a shift in the absorption in the reflectors, the cerium concentration in the scintillator ceramic can be reduced and this results in an increased light yield. In particular, the cerium content of the scintillator ceramic can be reduced by a factor of 2 to 4 compared to conventionally utilized ceramics, as a result of which the light yield is improved by approximately 4-5%.

Here, the signal drift is not only reduced in the scintillator ceramic, but additionally and, in particular, mainly in the reflectors laterally surrounding the pixels. If a photon is generated and emitted in the scintillator ceramic, there is a high probability that it impinges on a reflector. In a pixel surrounded by a number of reflectors, the emitted photon passes over a very long path in the scintillator ceramic doped with cerium due to multiple reflections on the reflectors and the grain boundaries of the scintillator ceramic. In general, the absorption is increased as a result of the long propagation.

The propagation of the photons in the scintillator ceramic is affected less, or not at all, when the cerium content is lowered (which has now been made possible), and therefore the absorptivity in the scintillator ceramic is reduced and hence the light yield is increased. At the same time, the signal drift is reduced by a suitable design of the reflectors, as a result of which the reduced amount of cerium in the scintillator ceramic is compensated for. The reduction in the amount of cerium also leads to a reduced sorting complexity in the design of the X-ray detector, which, on the one hand, leads to a reduction in costs and, on the other hand, leads to an improvement in the image quality as a result of fewer artifacts in the computed tomography image.

Preferably, provision is additionally made for a cover reflector, which is likewise designed for absorbing light with the predetermined wavelength range. Here, a pixel is surrounded by reflectors on five sides—four reflectors on the side and one on the top. Here, two or four of the lateral reflectors or all 5 reflectors (the four lateral reflectors and the cover reflector) can be designed for absorbing light with the predetermined wavelength range.

In respect of reducing the signal drift of a detector element, the reflectors are preferably designed for absorbing a wavelength range around 511 nm. The width of the absorption range is, for example, approximately 20-40 nm. Since the color centers, generated over time in the scintillator ceramic, influence the absorption properties of the scintillator ceramic particularly strongly at 511 nm, this measure reduces the signal drift in this wavelength range in a particularly effective fashion.

The reflectors expediently have absorptivity in the range between 0.5 and 60%. This means that between 0.5 and 60% of the intensity, in particular in the wavelength range around 511 nm, impinging on the reflector is absorbed.

As per an example refinement, the scintillator ceramic has a cerium doping of less than 50 ppm. As per a further preferred refinement, the scintillator ceramic has a cerium doping of less than 25 ppm. In particular, cerium can be dispensed with in the composition of the scintillator ceramic, wherein the signal drift produced as a result thereof is reduced as much as possible by the embodiment of the reflectors. However, the cerium component is preferably reduced to 5 ppm because this amount is required to control the afterglow.

The reflectors preferably have a yellow coloring for absorption purposes. The yellow coloring has an absorption band up to 520 nm and reduces the signal drift at 511 nm. Thanks to the yellow coloring, the signal drift can be reduced up to, in particular, a factor of 3 without large losses in the light yield being generated as a result of this.

According to an example variant, organic colorants are provided in the reflectors for generating the yellow coloring. By way of example, isoindole yellow and permanent yellow are suitable for this purpose. In addition or as an alternative to the organic colorants, a further preferred variant provides inorganic pigments, such as nickel titanium yellow, zirconium praseodymium silicate, bismuth vanadate, bismuth molybdate, iron oxide yellow or cadmium sulfide, for generating the yellow coloring in the reflectors. The organic pigments are added in the region of 0.05-3% of the reflector mass, while the inorganic pigments are added in the region of 1-50%.

According to at least one embodiment of the invention, an X-ray detector is disclosed, preferably for a computed tomography scanner, with a sensor arrangement according to one of the preceding variants.

The advantages and example embodiments listed in respect of the sensor arrangement should be transferred in an analogous fashion to the X-ray detector.

BRIEF DESCRIPTION OF THE DRAWINGS

An example embodiment of the invention will be described in more detail on the basis of drawings, in which FIG. 1 schematically shows a computed tomography scanner.

Figure 1:
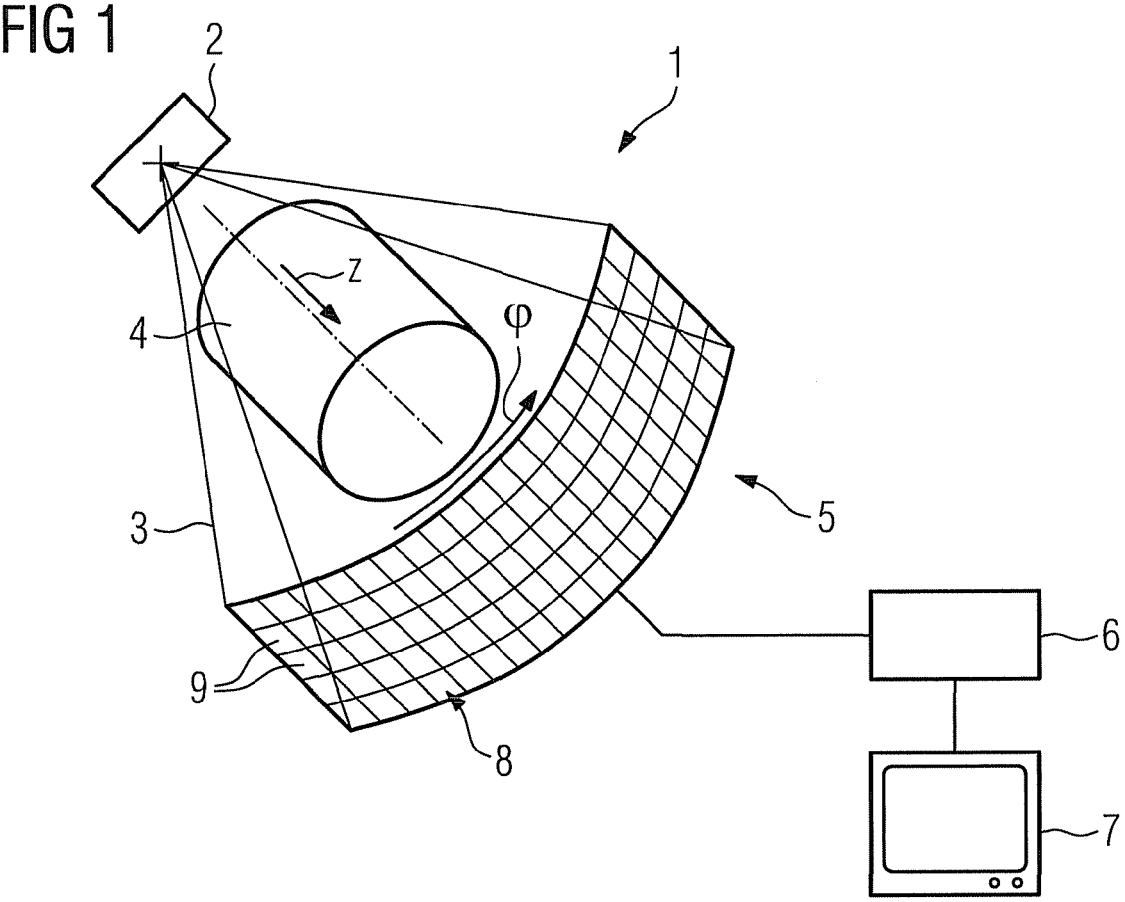

In the figures, parts with the same effect have been provided with the same reference signs.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a schematic illustration of a computed tomography scanner 1. The computed tomography scanner 1 basically comprises an X-ray source 2, which emits an X-ray bundle 3. The X-ray bundle 3 passes through an object 4 to be examined and impinges on a planar X-ray detector 5. The X-ray source 2 and the X-ray detector 5 are preferably arranged (not illustrated) opposite one another on a rotating frame of the computed tomography scanner 1, wherein the rotating frame is mounted such that it can rotate in a φ-direction about the system axis Z of the computed tomography scanner 1. The X-ray detector 5 detects the radiation passing through the object 4 and generates signals, which an image processor 6 can, in a known fashion, use to calculate one or more two or three-dimensional images that can be displayed on a display 7.

In this example embodiment, the X-ray detector 5 is a pixilated scintillator detector that comprises a scintillator arrangement 8 made of a multiplicity of pixels 9, wherein the pixels 9 are arranged next to one another on a partial cylinder surface in the φ-direction and in the Z-direction and thus form a two-dimensional array.

Figure 2:
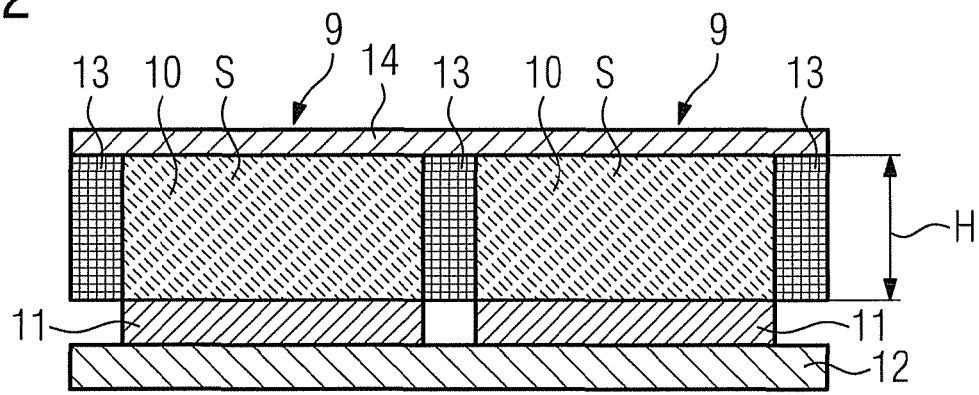
FIG. 2 shows a section through a sensor arrangement for an X-ray detector in a very much simplified illustration.

FIG. 2 schematically illustrates a section of the X-ray detector 5 in the Z-direction, in which two pixels 9 arranged next to one another are visible. Each pixel 9 comprises a scintillator layer 10 made of a scintillator ceramic S, in which the X-ray radiation is converted into visible light. By way of example, the scintillator ceramic S is an oxysulfide ceramic doped with praseodymium and cerium. Each pixel 9 is moreover associated with a photosensitive element, e.g. a photodiode 11, which detects the generated light. The scintillator layer 10 has a surface of approximately 1 $mm^2$ facing the X-ray source 2, and said scintillator layer has a height H of approximately 1.5 mm.

The pixels 9 in a row of the scintillator arrangement 8 are attached on a common printed circuit board 12. Reflectors are provided between the scintillator layers 10 of the individual pixels 9, and these reflectors in particular surround the scintillator layers 10 on four sides and thus define the boundaries of the pixels 9 in the φ-Z plane. The reflectors 13 comprise titanium dioxide, which reflects visible light well, with the titanium dioxide being mixed with epoxy resin as a binding material. As a result of the reflecting properties of the titanium dioxide, the reflectors 13 prevent photons generated in the scintillator layers 10 of a certain pixel 9 from penetrating into the adjacent pixel 9. Additionally, a cover reflector 14 is provided over the scintillator layer 10 (between the X-ray source 2 and the scintillator layer 10).

Figure 3:
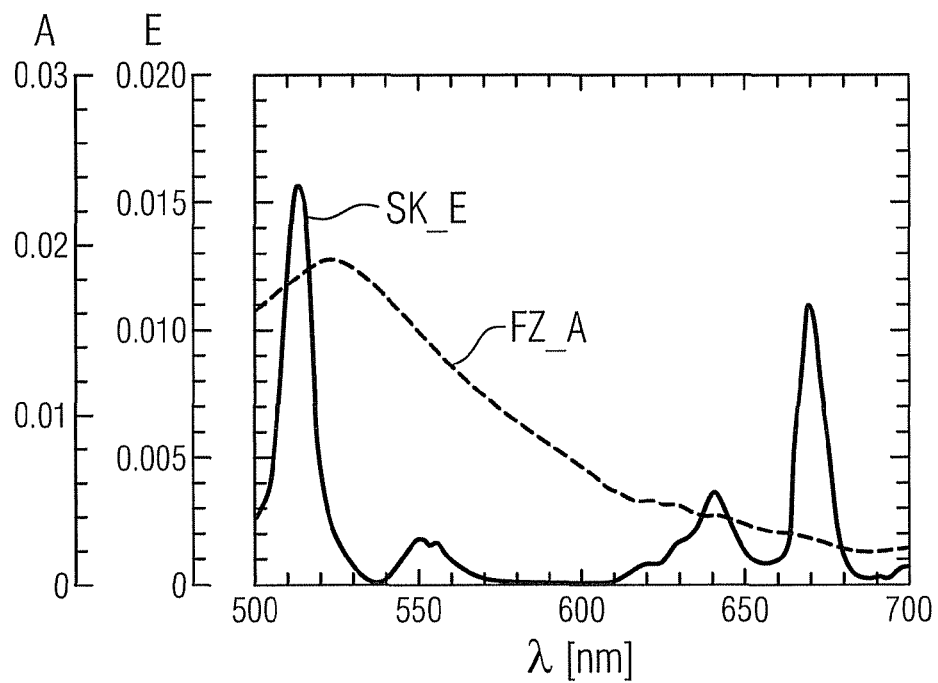
FIG. 3 shows a diagram of the emissivity of a scintillator ceramic and the absorptivity of the color centers of the scintillator ceramic.

FIG. 3 plots the dimensionless emissivity E and the dimensionless absorptivity A (values between 0 for no emission/absorption and 1 for complete emission/absorption) of the scintillator ceramic S at a wavelength between 500 nm and 700 nm. Here, the curve SK_E represents the emission of the scintillator ceramic S doped with praseodymium, which has three peaks at 511 nm, 637 nm and 670 nm, with the emissivity of the scintillator ceramic being approximately 0.016 at 511 nm, approximately 0.004 at 637 nm and approximately 0.012 at 670 nm. The absorption property of the color centers generated over time in the ceramic, specified by the curve FZ_A (dashed line), is superimposed onto the emission of the scintillator ceramic S. What can be gathered from comparing the two curves is that the greatest absorptivity of the color centers of approximately 0.02 is at approximately 520 nm and thus strongly influences the scintillator ceramic emission at 511 nm, leading to an undesired drift of the measurement signal of the scintillator ceramic S.

In order to reduce the afterglow of the scintillator ceramic S, the latter is additionally doped with cerium, wherein a yellow coloring of the ceramic is generated by the oxidation of $Ce^{3+}$ to $Ce^{4+}$. As a result of the yellow coloring, the scintillator ceramic S emission at 511 nm is absorbed and hence the signal drift is reduced in this wavelength range. In the process, it holds true that increasing the Ce-concentration in the scintillator ceramic S increasingly reduces the signal drift. However, an increased amount of Ce leads to a lower light yield, with the drop in light yield possibly being up to 20%.

In order to increase the light yield, the amount of cerium is reduced in the scintillator ceramic S. In respect of a reduction in the signal drift, the reduced amount of cerium is compensated for by a yellow coloring being brought about in the lateral reflectors 13 and/or in the cover reflector 14 as a result of organic colorants and/or as a result of inorganic pigments and so the emission of the scintillator ceramic at approximately 511 nm is absorbed in the reflectors 13. Here, two of the five, four of the five, or five of the five reflector sides of a pixel 9 can be dyed yellow.

Figure 4:
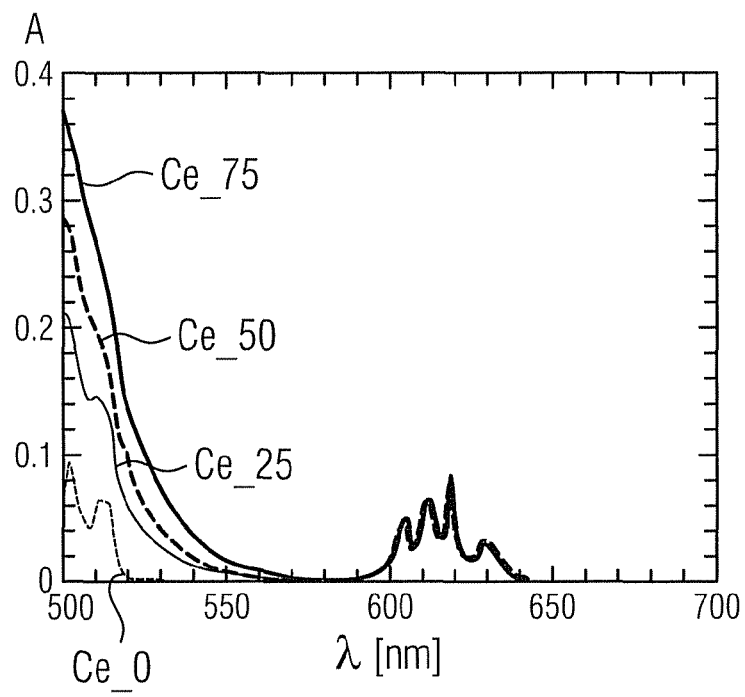
FIG. 4 shows a diagram of the absorptivity of a scintillator ceramic as a function of the amount of doped cerium.

The effect of reducing the amount of cerium is shown in FIG. 4 by the curve profiles for the different Ce-concentrations. The curve Ce_75 (dash-dotted line) represents the absorptivity A of the scintillator ceramic S at 75 ppm cerium, the curve Ce_50 (dotted line) shows the absorptivity at 50 ppm, the curve Ce_25 (full line) shows the absorptivity at 25 ppm and the curve Ce_0 (dashed line) shows the absorptivity when no cerium is contained in the scintillator ceramic S.

The properties of a disk of scintillator ceramic S were examined in a series of trials. Therein, the amount of cerium in the scintillator ceramic S and the color of the reflectors were varied.

A first normalized trial was performed using a ceramic disk with a standard cerium concentration of 25 ppm and unmodified white reflectors. In this trial, a signal drift of 0.4% was determined (i.e. a decrease in the signal intensity by 0.4%).

During a second trial, a ceramic disk was doped with only ¼ of the standard cerium concentration and white reflectors were used once again. As a result of the low amount of cerium in the ceramic, a drift of 0.72% was measured in this case but the light yield in this measurement increased by 10% compared to the normalized trial.

During a third trial, a ceramic disk was used which had ¼ of the standard cerium concentration and modified, yellow-dyed reflectors. This trial yielded a drift of 0.24%, wherein a 4% increase in the light yield was determined compared to the normalized trial.

It can be also determined, inter alia, from the series of trials that the light yield in a scintillator ceramic S can be increased by decreasing the cerium concentration in the scintillator ceramic. Here, the absorption of at least the wavelength range about 511 nm is shifted in the surrounding reflectors 13 by dying the reflectors 13 yellow in order to reduce the signal drift.

The patent claims filed with the application are formulation proposals without prejudice for obtaining more extensive patent protection.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims, indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A scintillator arrangement for detecting X-ray radiation, comprising:
a plurality of pixels, each pixel being separated from one another by reflectors and including a scintillator ceramic configured to convert the X-ray radiation into visible light, wherein the reflectors include titanium dioxide and a binding material, the reflectors having a yellow coloring configured to absorb light with a wavelength range which corresponds to an emission band of the scintillator ceramic.

2. The scintillator arrangement as claimed in claim 1, further comprising a cover reflector configured to absorb light with the wavelength range.

3. The scintillator arrangement as claimed in claim 2, wherein the reflectors are configured to absorb a wavelength range around 511 nm.

4. The scintillator arrangement as claimed in claim 3, wherein the reflectors have absorptivity in the range between 0.5 and 60%.

5. The scintillator arrangement as claimed in claim 2, wherein the reflectors have absorptivity in the range between 0.5 and 60%.

6. An X-ray detector comprising:
a scintillator arrangement as claimed in claim 2.

7. The scintillator arrangement as claimed in claim 1, wherein the reflectors are configured to absorb a wavelength range around 511 nm.

8. The scintillator arrangement as claimed in claim 7, wherein the reflectors have absorptivity in the range between 0.5 and 60%.

9. An X-ray detector comprising:
a scintillator arrangement as claimed in claim 7.

10. The scintillator arrangement as claimed in claim 1, wherein the reflectors have absorptivity in the range between 0.5 and 60%.

11. An X-ray detector comprising:
a scintillator arrangement as claimed in claim 10.

12. The scintillator arrangement as claimed in claim 1, wherein the scintillator ceramic has a cerium doping of less than 50 ppm.

13. The scintillator arrangement as claimed in claim 1, wherein the scintillator ceramic has a cerium doping of less than 25 ppm.

14. The scintillator arrangement as claimed in claim 1, wherein organic colorants are provided in the reflectors for generating the yellow coloring.

15. The scintillator arrangement as claimed in claim 14, wherein inorganic pigments are provided in the reflectors for generating the yellow coloring.

16. The scintillator arrangement as claimed in claim 14, wherein 0.05 to 3 percent of a mass of the reflectors includes organic pigments.

17. The scintillator arrangement as claimed in claim 1, wherein inorganic pigments are provided in the reflectors for generating the yellow coloring.

18. The scintillator arrangement as claimed in claim 17, wherein 1 to 50 percent of a mass of the reflectors includes inorganic pigments.

19. An X-ray detector comprising:
a scintillator arrangement as claimed in claim 1.

20. The scintillator arrangement as claimed in claim 1, wherein the binding material includes epoxy resin.

* * * * *